United States Patent
Moon et al.

(10) Patent No.: US 12,353,322 B2
(45) Date of Patent: Jul. 8, 2025

(54) METHOD AND DEVICE FOR DEALLOCATING DYNAMICALLY ALLOCATED MEMORY AREA

(71) Applicant: UNIST (Ulsan National Institute of Science and Technology), Ulsan (KR)

(72) Inventors: Hyungon Moon, Ulsan (KR); Chanyoung Park, Ulsan (KR); Jaehyu Lee, Ulsan (KR); Daeyeon Kim, Ulsan (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 0 days.

(21) Appl. No.: 18/522,403

(22) Filed: Nov. 29, 2023

(65) Prior Publication Data

US 2024/0193079 A1     Jun. 13, 2024

(30) Foreign Application Priority Data

Dec. 8, 2022 (KR) ........................ 10-2022-0170530
Mar. 20, 2023 (KR) ........................ 10-2023-0035857

(51) Int. Cl.
*G06F 12/02*     (2006.01)
*G06F 12/14*     (2006.01)

(52) U.S. Cl.
CPC ........ *G06F 12/023* (2013.01); *G06F 12/1441* (2013.01); *G06F 2212/1052* (2013.01)

(58) Field of Classification Search
CPC ............... G06F 12/023; G06F 12/1441; G06F 2212/1052
See application file for complete search history.

(56) References Cited

U.S. PATENT DOCUMENTS

| | | | |
|---|---|---|---|
| 7,065,630 B1 * | 6/2006 | Ledebohm | G06F 12/1081 711/170 |
| 7,409,487 B1 * | 8/2008 | Chen | G06F 12/1036 711/6 |
| 8,255,887 B2 | 8/2012 | Heil | |
| 2015/0227414 A1 | 8/2015 | Varma | |
| 2019/0306087 A1 | 10/2019 | Masputra et al. | |
| 2021/0240638 A1 * | 8/2021 | Deutsch | G06F 12/1408 |
| 2022/0137841 A1 | 5/2022 | Gisbert et al. | |

OTHER PUBLICATIONS

Ainsworth et al., "MarkUs: Drop-in use-after-free prevention for low-level languages" University of Cambridge, UK, 14 pages.
Dang et al., "Oscar: A Practical Page-Persmissions-Based Scheme for Thwarting Dangling Pointers", University of California, Berkeley, 18 pages.

(Continued)

*Primary Examiner* — Hosain T Alam
*Assistant Examiner* — Subir Kumar Chowdhury
(74) *Attorney, Agent, or Firm* — Armstrong Teasdale LLP

(57) ABSTRACT

Another electronic device includes a processor configured to, while the processor maintains user privilege, receive a deallocation request for a dynamically allocated target memory area, while the processor maintains kernel privilege, determine whether another memory area including a code accessing the target memory area exists, and when the other memory area does not exist, while the processor maintains the user privilege, deallocate the target memory area.

17 Claims, 9 Drawing Sheets

(56) References Cited

OTHER PUBLICATIONS

Lee et al., "Preventing Use-after-free with Dangling Pointers Nullification", School of Computer Science, Georgia Institute of Technology, 15 pages.
Van der Kouwe et al., "DangSan: Scalable Use-after-free Detection", Brije Universiteit Amsterdam, 15 pages.
Wickman et al., "Preventing Use-After-Free Attacks with Fast Forward Allocation", 18 pages.

* cited by examiner

METHOD AND DEVICE FOR DEALLOCATING DYNAMICALLY ALLOCATED MEMORY AREA

CROSS-REFERENCE TO RELATED APPLICATION

This application claims the benefit of Korean Patent Application No. 10-2022-0170530 filed on Dec. 8, 2022 and Korean Patent Application No. 10-2023-0035857 filed on Mar. 20, 2023, in the Korean Intellectual Property Office, the entire disclosures of which are incorporated herein by reference for all purposes.

BACKGROUND

1. Field of the Invention

One or more embodiments relate to a technology for deallocating a dynamically allocated memory area.

2. Description of the Related Art

A use-after-free vulnerability is one of vulnerabilities that often occurs in software written in low-level languages such as C and C++, and occurs when a pointer indicating an already deallocated heap area is accidentally left in a memory and then used by another code. If an attacker exploits the code, the code which is not intended by a developer may be used to obtain or modify a content of specific data to achieve an attack goal such as elevation of privilege or information leakage, and thus, various technologies for managing the vulnerability have been proposed in many studies.

For example, the simplest technique to defend against an attack exploiting the use-after-free vulnerability may include a method of nullifying all pointers when an object is released. According to a comparative example disclosed in the thesis "Lee, Byoungyoung, et al. "Preventing use-after-free with dangling pointers nullification." NDSS. 2015.", when a relationship between all pointers and an object is formed and the corresponding object is released, the pointers may be nullified. According to a comparative example disclosed in the thesis "Van Der Kouwe, Erik, Vinod Nigade, and Cristiano Giuffrida. "Dangsan: Scalable use-after-free detection." Proceedings of the Twelfth European Conference on Computer Systems. 2017.", a dangling pointer may be detected in a multi-thread system using shadow memory-based metadata similarly to a log-structured file system.

In another example, there is a one-time allocation (OTA) technology for fundamentally preventing use after releasing, by not reusing a used virtual address, even if a heap allocator is deallocated. Among them, according to a comparative example disclosed in the thesis "T. H. Dang, P. Maniatis, and D. Wagner. Oscar: A practical page-permissions-based scheme for thwarting dangling pointers. In Proceedings of the 26th USENIX Security Symposium (Security), Vancouver, Canada, August 2017.", each object creates a unique virtual shadow page, but each shadow page is positioned in the same physical frame, and a unique page corresponding to the corresponding object is released at the time of deallocation. According to a comparative example disclosed in the thesis "B. Wickman, H. Hu, I. Yun, D. Jang, J. Lim, S. Kashyap, and T. Kim. Preventing Use-After-Free Attacks with Fast Forward Allocation (to appear). In Proceedings of the 30th USENIX Security Symposium (Security), Vancouver, B.C., Canada, August 2021.", an OTA technology without reuse of a virtual address may be provided.

SUMMARY

According to an aspect, there is provided a method of deallocating a dynamically allocated memory area performed by a processor, the method including, while the processor maintains user privilege, receiving a deallocation request for a dynamically allocated target memory area. The method of deallocating the dynamically allocated memory area performed by the processor includes, while the processor maintains kernel privilege, determining whether another memory area including a code accessing the target memory area exists. The method of deallocating the dynamically allocated memory area performed by the processor includes, while the processor maintains the user privilege, when the other memory area does not exist, deallocating the target memory area.

The determining of whether the other memory area exists may include, while the processor maintains the kernel privilege, determining whether the other memory area exists through a marking thread, from which execution with the user privilege is excluded.

The determining of whether the other memory area exists may include, when a dirty bit of a page table entry accessed with the kernel privilege has a first value, searching for a page corresponding to the page table entry. The determining of whether the other memory area exists may include, when the dirty bit of the page table entry accessed with the kernel privilege has a second value, skipping a search of the page corresponding to the page table entry.

The searching of the page corresponding to the page table entry may include, when the search of the page is completed, changing the dirty bit of the page table entry from the first value to the second value.

The method of deallocating the dynamically allocated memory area performed by the processor may further include, while a process is executed by the processor, when data stored in a page is changed, setting the dirty bit of the page table entry of the page to the first value.

The determining of whether the other memory area exists may include obtaining a first map indicating whether a deallocation request for a heap memory area is received. The determining of whether the other memory area exists may include obtaining a second map indicating whether the heap memory area is accessed by a code of the other memory area. The determining of whether the other memory area exists may include determining whether the other memory area including a code accessing a memory area requested to be deallocated exists by comparing the first map with the second map.

The receiving of the deallocation request may include, when the deallocation request for the target memory area is received, while the processor maintains the user privilege, storing an address of the target memory area in a first buffer. The determining of whether the other memory area exists may include, when the address of the target memory area is stored in the first buffer, while the processor maintains the kernel privilege, determining whether the other memory area including a code which refers to the address of the target memory area stored in the first buffer exists.

The method of deallocating the dynamically allocated memory area performed by the processor may further include, when the other memory area exists, maintaining the storage of the address of the target memory area in the first buffer.

The method of deallocating the dynamically allocated memory area may include, when the other memory area does not exist, while the processor maintains the kernel privilege, deleting the address of the target memory area from the first buffer and storing the address in a second buffer. The deallocating of the target memory area may include, when the address of the target memory area is stored in the second buffer, deallocating the target memory area. The deallocating of the target memory area may include deleting the address of the target memory area from the second buffer.

The determining of whether the other memory area exists may include, while the processor maintains the kernel privilege while maintaining a process by the processor, performing an asynchronous search of a page including the code accessing the target memory area by scanning a plurality of pages based on a page table. The determining of whether the other memory area exists may include, while the processor maintains the kernel privilege, stopping the process by the processor, and performing a synchronous search of the page including the code accessing the target memory area.

The determining of whether the other memory area exists may include, when the execution of the synchronous search is completed, resuming the process by the processor, and while the processor maintains the kernel privilege, performing the asynchronous search again.

The performing of the synchronous search of the page may include performing the synchronous search for a register area together with the memory area.

The method of deallocating the dynamically allocated memory area performed by the processor may further include, when the other memory area including the code accessing the target memory area exists, restricting deallocation of the target memory area. The method of deallocating the dynamically allocated memory area performed by the processor may further include redetermining whether the other memory area exists.

The receiving of the deallocation request may include, when a size of the target memory area requested to be deallocated is equal to or more than a threshold size, releasing a physical memory of the page by deleting the physical address of the page corresponding to the target memory area from a page table.

The deallocating of the target memory area may include, when a size of the target memory area requested to be deallocated is equal to or more than a threshold size, deallocating the target memory area by deleting a virtual address of a page corresponding to the target memory area from a page table.

According to an aspect, there is provided an electronic device including a processor configured to, while the processor maintains user privilege, receive a deallocation request for a dynamically allocated target memory area, while the processor maintains kernel privilege, determine whether another memory area including a code accessing the target memory area exists, and when the other memory area does not exist, while the processor maintains the user privilege, deallocate the target memory area.

The processor may be configured to, while the processor maintains the kernel privilege, determine whether the other memory area exists through a marking thread, from which execution with the user privilege is excluded.

The processor may be configured to, when a dirty bit of a page table entry accessed with the kernel privilege has a first value, search for a page corresponding to the page table entry. The processor may be configured to, when the dirty bit of the page table entry accessed with the kernel privilege has a second value, skip a search of the page corresponding to the page table entry.

The processor may be configured to, when the search of the page is completed, change the dirty bit of the page table entry from the first value to the second value.

The processor may be configured to, while a process is executed by the processor, when data stored in a page is changed, set the dirty bit of the page table entry of the page to the first value.

The processor may be configured to obtain a first map indicating whether a deallocation request for a heap memory area is received. The processor may be configured to obtain a second map indicating whether the heap memory area is accessed by a code of the other memory area. The processor may be configured to determine whether the other memory area including a code accessing a memory area requested to be deallocated exists by comparing the first map with the second map.

The processor may be configured to, when the deallocation request for the target memory area is received, while the processor maintains the user privilege, store an address of the target memory area in a first buffer. The processor may be configured to, when the address of the target memory area is stored in the first buffer, while the processor maintains the kernel privilege, determine whether the other memory area including a code which refers to the address of the target memory area stored in the first buffer exists.

The processor may be configured to, when the other memory area exists, maintain the storage of the address of the target memory area in the first buffer.

The processor may be configured to, when the other memory area does not exist, while the processor maintains the kernel privilege, delete the address of the target memory area from the first buffer and store the address in a second buffer. The processor may be configured to, when the address of the target memory area is stored in the second buffer, deallocate the target memory area. The processor may be configured to delete the address of the target memory area from the second buffer.

The processor may be configured to, while the processor maintains the kernel privilege while maintaining a process by the processor, perform an asynchronous search of a page including the code accessing the target memory area by scanning a plurality of pages based on a page table. The processor may be configured to, while the processor maintains the kernel privilege, stop the process by the processor, and perform a synchronous search of the page including the code accessing the target memory area.

The processor may be configured to, when the execution of the synchronous search is completed, resume the process by the processor, and while the processor maintains the kernel privilege, perform the asynchronous search again.

The processor may be configured to perform the synchronous search for a register area together with the memory area.

The processor may be configured to, when the other memory area including the code accessing the target memory area exists, restrict deallocation of the target memory area. The processor may be configured to redetermine whether the other memory area exists.

The processor may be configured to, when a size of the target memory area requested to be deallocated is equal to or more than a threshold size, release a physical memory of the page by deleting the physical address of the page corresponding to the target memory area from a page table.

The processor may be configured to, when a size of the target memory area requested to be deallocated is equal to or more than a threshold size, deallocate the target memory area by deleting a virtual address of a page corresponding to the target memory area from a page table.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
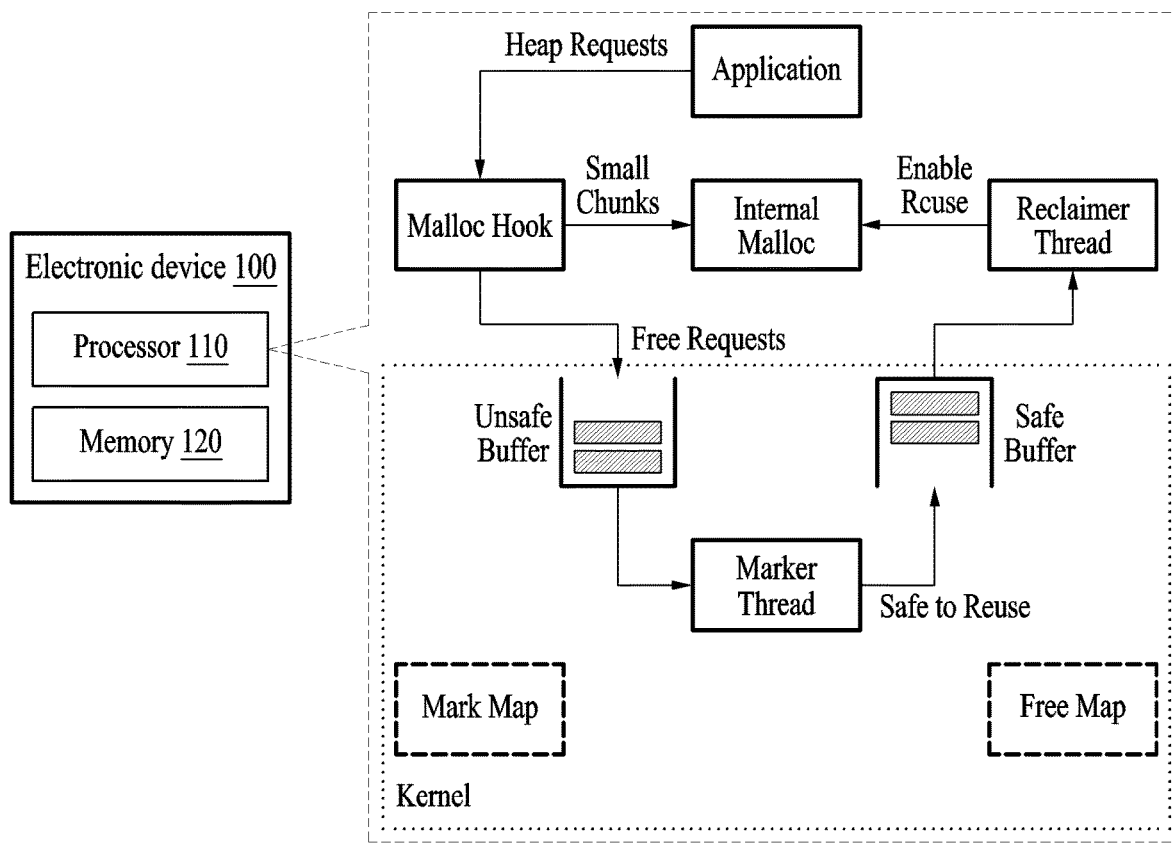
FIG. 1 is a block diagram illustrating an electronic device for deallocating a dynamically allocated memory area according to various embodiments.

The following structural or functional descriptions of embodiments described herein are merely intended for the purpose of describing the embodiments described herein and may be implemented in various forms. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the embodiments will be described in detail with reference to the accompanying drawings. When describing an embodiment with reference to the accompanying drawings, like reference numerals refer to like elements and a repeated description related thereto will be omitted.

Use-After-Free may be a long-standing memory safety issue. A programming language with manual memory management may require a developer to explicitly release a heap chunk so that the heap chunk may be reused later by another object. However, it may not be easy to confirm whether a pointer of a released heap chunk exists on a memory. This may be the main reason why many software still have this kind of vulnerability, despite many previous studies. It is known that delaying the reuse of the corresponding chunk until a dangling pointer for the released memory chunk disappears from the memory is one of promising methods to defend against use-after-free exploits by an attacker.

A general threat model assumed in existing use-after-free defense techniques may be assumed. The attacker is assumed to know the use-after-free vulnerability of a victim program, and the first vulnerability that the attacker exploits may be the use-after-free vulnerability. In addition, the attacker may exploit the use-after-free vulnerability by providing malicious inputs to a vulnerable program. Use-after-free defense techniques according to comparative examples disclosed in the thesis "S. Ainsworth and T. M. Jones. MarkUs: Drop-in use-after-free prevention for low-level languages. In Proceedings of the 41st IEEE Symposium on Security and Privacy (Oakland), San Francisco, CA, May 2020" may be designed only for the use-after-free defense of heap objects.

FIG. 1 is a block diagram illustrating an electronic device for deallocating a dynamically allocated memory area according to various embodiments.

In order to be easily applied to a plurality of heap allocators, an electronic device 100 according to an embodiment may implement a Malloc Hook thread (shown as Malloc Hook in FIG. 1) in the form of hooking heap management functions (e.g., malloc, free). For example, as shown in FIG. 1, the electronic device 100 may relay memory allocation and deallocation requests input to a heap allocator using the Malloc Hook thread, and particularly, transmit a marker thread (shown as Marker Thread in FIG. 1) being executed with kernel privilege, instead of directly releasing an address (or a pointer) of a target memory area requested to be deallocated. The electronic device 100 according to an embodiment may confirm whether the target memory area requested to be deallocated is safe to be reused through the marker thread, and transmit an address of the target memory area to a reclaimer thread (shown as Reclaimer Thread in FIG. 1) being executed with user privilege. The reclaimer thread may process the target memory area requested to be deallocated, to be reused through the heap allocator.

According to an embodiment, when the electronic device 100 receives a deallocation request for a large chunk, the Malloc Hook thread recall the same mapping to a MAP_FIXED flag before transmitting the address of the target memory area to the marker thread, thereby releasing only a physical memory and maintaining the mapping. Then, the large chunk (e.g., a virtual page) may be reused or unmapped only in a safe state without a dangling pointer, in the same manner as a small chunk.

The Malloc Hook thread of the electronic device 100 may be implemented as a wrapper of an internal heap allocator. For example, when the deallocation request is received, the electronic device 100 may confirm, using the Malloc Hook thread, whether the deallocation request may be processed directly through a mmap system call, and may process a larger chunk having a threshold size or more by requesting separate mapping autonomously without transmitting the large chunk to the internal heap allocator. For example, the threshold size may be set to 128 megabytes (MB). However, the threshold size in the present disclosure is not limited to 128 MB and may be changed according to design. Then, the electronic device 100 may transmit, using the Malloc Hook thread, the address and the size of the target memory area requested to be deallocated to the marker thread executed with the kernel privilege through a sharing buffer (e.g., an unsafe buffer (shown as Unsafe Buffer in FIG. 1)). Information for an operating system to support the mark-and-sweep technique may include the address and the size of the target memory area, and the information for supporting the mark-and-sweep technique may be transmitted through the sharing buffer (e.g., an unsafe buffer (shown as Unsafe Buffer in FIG. 1)). Finally, the electronic device 100 may process a call for a realloc request in a similar manner as the processing of the deallocation request described above using the Malloc Hook thread.

The electronic device 100 may determine whether the target memory area requested to be deallocated is safe through the marker thread executed with a kernel privilege while a processor 110 maintains the kernel privilege. The target memory area requested to be deallocated may be deallocated at a time point when the target memory area is determined to be safe after the deallocation request is received (e.g., a time point delayed from the deallocation request).

The electronic device 100 may mark memory areas, of which the deallocation is delayed, (e.g., memory areas requested to be deallocated but not deallocated yet) on a free map implemented as a bitmap, and confirm a total size, through the marker thread executed with the kernel privilege. After that, the electronic device 100 may identify a dirty page through a dirty bit by directly accessing a page table with the kernel privilege while the processor 110 maintains the kernel privilege. The electronic device 100 may perform kernel mapping for the dirty page with the kernel privilege and read the memory, while the processor 110 maintains the kernel privilege, thereby performing a marking procedure (e.g., a page search operation). Through the marking procedure, the electronic device may obtain a mark map indicating whether another memory area including a code to access a heap memory area is included. After that, when the size of the delayed memory exceeds a certain percentage of the heap memory, a synchronous search, which is a synchronous marking procedure, may be performed using a task_work callback provided by the Linux kernel. Finally, while the processor 110 maintains the kernel privilege, the electronic device 100 may confirm whether a dangling pointer accessing the target memory area exists in another memory area with the kernel privilege, and may transmit information of a reusable memory area to the reclaimer thread executed with the user privilege through a sharing buffer (e.g., a safe buffer (shown as Safe Buffer in FIG. 1)).

The electronic device 100 may concurrently execute a process with the user privilege, while the processor 110 maintains the user privilege, in order to reuse the safe memory areas transmitted from the marker thread to the reclaimer thread. The electronic device 100 may identify pointers transmitted to the reclaimer thread through the sharing buffer (e.g., the safe buffer (shown as Safe Buffer in FIG. 1)). In a case of a chunk having a small target memory area (e.g., when a size of the target memory area is less than the threshold size), information of the target memory area may be returned to the heap allocator, and in a case of a chunk having a large target memory area (e.g., when the size of the target memory area is the threshold size or more), the mapping of the target memory area may be released.

The electronic device 100 may include a processor and a memory.

The processor 110 may execute a process with at least one of user privilege or kernel privilege. The user privilege is less trusted than the kernel privilege and thus may refer to a more restrictive privilege. The kernel privilege is more trusted than the user privilege and thus may refer to a less restrictive privilege. In general, application program processes may be executed with the user privilege in which the processes are isolated and may not be interfered with each other's resources. Also, the processes may have limited access to all computer resources only through a system call. In a case of making a system call, when an exception or fault is generated, when an interruption occurs, or the like, user processes may be executed by switching the user privilege to the kernel privilege. A process executed with the kernel privilege may receive the privilege and have access to all computer resources (such as all available memories), without restrictions applied to the process executed with the user privilege. Since an operating system kernel functions as a gatekeeper to computer resources, direct access to the resource may be limited to a process executed with the kernel privilege.

Hereinafter, in the present disclosure, the performing of the operation by the processor with the user privilege may correspond to the performing of the corresponding operation while the processor maintains the user privilege. Similarly, the performing of the operation by the processor with the kernel privilege may correspond to the performing of the corresponding operation while the processor maintains the kernel privilege.

The processor 110 may receive the deallocation request for the dynamically allocated target memory area while the processor 110 maintains the user privilege, determine whether another memory area including a code accessing the target memory area exists while the processor 110 maintains the kernel privilege, and deallocate the target memory area while the processor 110 maintains the user privilege, when the other memory area does not exist.

A memory 120 may store instructions for receiving a deallocation request, determining whether the other memory area exists, and/or performing the deallocation of the target memory area. However, these are merely examples, and the information stored in the memory 120 is not limited thereto.

Figure 2:
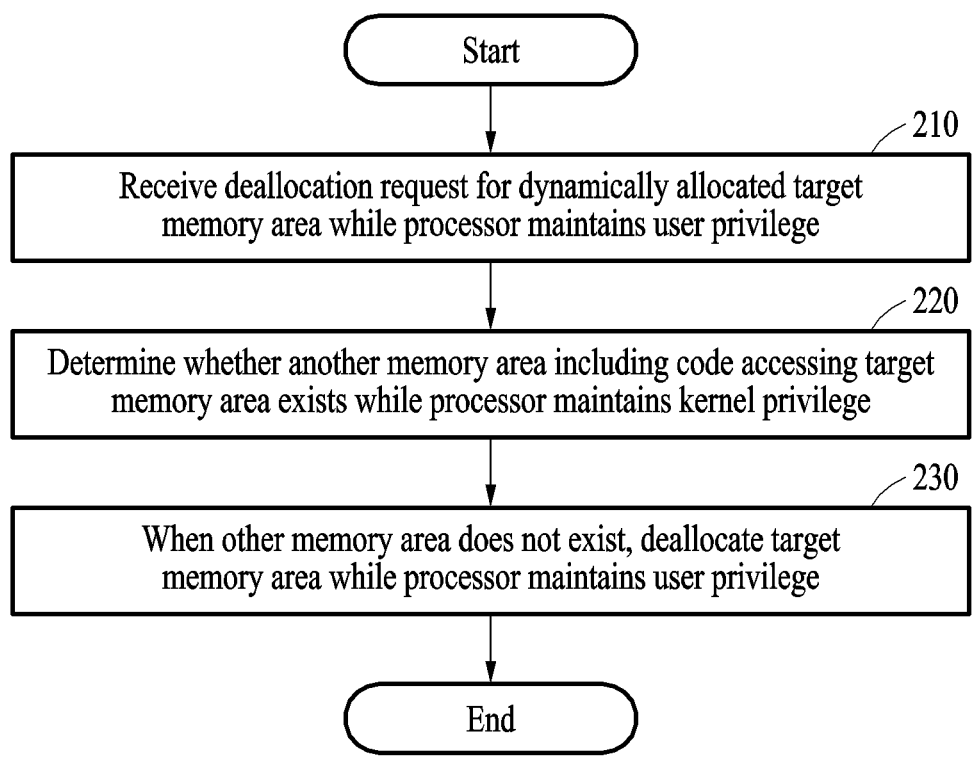
FIG. 2 is a flowchart illustrating a method of deallocating a dynamically allocated memory area according to various embodiments.

FIG. 2 is a flowchart illustrating a method of deallocating a dynamically allocated memory area according to various embodiments.

An electronic device (e.g., the electronic device 100 of FIG. 1) according to an embodiment may perform the method of deallocating a dynamically allocated memory area. According to an embodiment, the method of deallocating the dynamically allocated memory area may include operation 210 of receiving a deallocation request for a dynamically allocated target memory area with user privilege, operation 220 of determining whether another memory area including a code accessing the target memory area exists with kernel privilege, and operation 230 of deallocating the target memory area with user privilege, when the other memory area does not exist.

In operation 210, the electronic device may receive a deallocation request for the dynamically allocated target memory area while the processor maintains the user privilege. The target memory area may refer to a memory area requested to be deallocated. For example, the target memory area, as at least a part of a heap memory area, may be a memory dynamically allocated and used by a user. When the use of the target memory area is finished after the target memory area is allocated and used, the user may input the deallocation request for the tar memory area. The electronic device may receive the deallocation request for the target memory area with the user privilege (e.g., using the Malloc Hook thread executed with the user privilege of FIG. 1).

When the deallocation request is received, the electronic device may update a set of the memory areas requested to be deallocated. For example, the electronic device may obtain a first map (e.g., a free map) indicating whether the deallocation is requested for the heap memory area. For example, when an element of the free map is a first value (e.g., 1), a heap memory area corresponding to the corresponding element may be the memory area requested to be deallocated. When the element of the free map is a second value (e.g., 0), a heap memory area corresponding to the corresponding element may be a memory area not requested to be deallocated. The obtaining of the first map will be described in more detail with reference to FIG. 4.

In operation 220, the processor may determine whether the other memory area including a code accessing the target memory area exists while the processor maintains the kernel privilege. For example, the electronic device may determine whether the other memory area exists through a marking thread from which the execution with the user privilege is excluded.

The other memory area may include the code accessing the target memory area. For example, the other memory area may include a dangling pointer for accessing the target memory area already requested to be deallocated. When the other memory area exists, the deallocation of the target memory area may be determined to be unsafe. When the other memory area does not exist, the deallocation and/or reuse of the target memory area may be determined to be safe.

In operation 230, when the other memory area does not exist, the electronic device may deallocate the target memory area while the processor maintains the user privilege.

When the target memory area is deallocated, the electronic device may update the free map. For example, the electronic device may change an element corresponding to the target memory area from the first value (e.g., 1) to the second value (e.g., 0).

Although not clearly shown in FIG. 2, the electronic device may restrict the deallocation of the target memory area, when the other memory area exists. According to an embodiment, when the other memory area storing a code accessing the target memory area exists, the electronic device may restrict the deallocation of the target memory area. The electronic device may redetermine whether the other memory area exists. For example, the electronic device may repeatedly determine whether the other memory area exists, and when the other memory area does not exist, stop determining whether the other memory area exists, and deallocate the target memory area.

Figure 3:
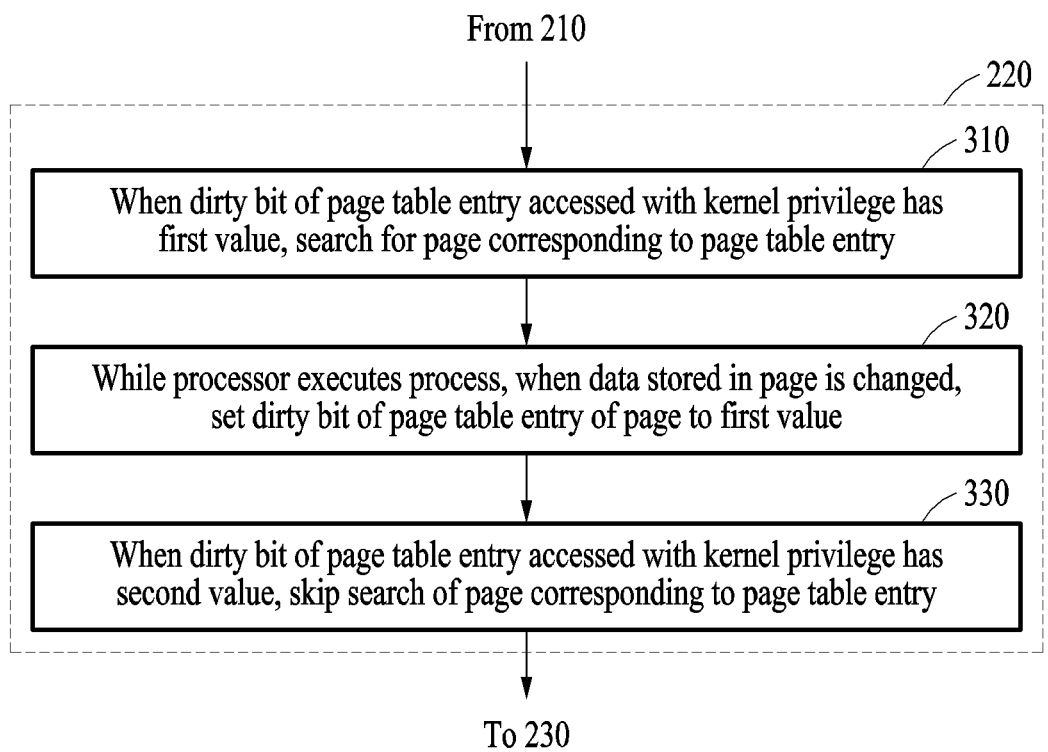
FIG. 3 is a flowchart illustrating an operation of determining whether another memory area exists using a dirty bit by an electronic device according to various embodiments.

FIG. 3 is a flowchart illustrating an operation of determining whether another memory area exists using a dirty bit by an electronic device according to various embodiments.

An electronic device (e.g., the electronic device 100 of FIG. 1) according to an embodiment may, with kernel privilege, determine whether the other memory area exists using a dirty bit.

According to an embodiment, the electronic device may repeat the operation of determining whether the other memory area exists. For example, the electronic device may repeatedly determine whether to access the other memory area (e.g., the heap memory area) in each page.

The dirty bit is a flag indicating whether data of a corresponding page is changed from a specific time point, and may be included in each page table entry of a page table.

The specific time point may include a time point when the corresponding page is last searched for. For example, when the dirty bit has a first value (e.g., 1), it may indicate that the corresponding page is changed from the specific time point. When the dirty bit has a second value (e.g., 0), it may indicate that the corresponding page is not changed from the specific time point.

In operation 310, when the dirty bit of the page table entry accessed with the kernel privilege has the first value (e.g., 1), the electronic device may search for a page corresponding to the page table entry. When the dirty bit has the first value (e.g., 1), the electronic device may search for a corresponding page to determine whether the corresponding page includes a code accessing the target memory area, since data of the corresponding page is changed from the data at the specific time point.

The electronic device may determine whether the corresponding page includes the code accessing the heap memory area by searching for the page. For example, the electronic device may obtain a second map (e.g., a mark map) indicating whether another memory area (e.g., a page) accessing the heap memory area exists. The obtaining of the second map will be described in more detail with reference to FIG. 4.

In operation 320, when the page search is completed, the electronic device may change the dirty bit of the page table entry from the first value (e.g., 1) to the second value (e.g., 0). By setting the dirty bit of the page table to the second value (e.g., 0), the electronic device may display that the search of the page corresponding to the corresponding page table is completed through the dirty bit.

After that, while the processor executes the process, when data stored in the page is changed, the electronic device may set the dirty bit of the page table entry of the page to a first value (e.g., 1). For example, while the processor executes the process, when the data stored in the page is changed and the dirty bit of the page table entry of the corresponding page is set to the second value (e.g., 0), the electronic device may change the dirty bit to the first value (e.g., 1). In a subsequent operation of determining whether the other memory area exists, since the dirty bit is changed to have the first value (e.g., 1), the electronic device may determine whether the corresponding page includes a code accessing the heap memory area.

In operation 330, when the dirty bit of the page table entry accessed with the kernel privilege has the second value (e.g., 0), the electronic device may skip the search of the page corresponding to the page table entry. When the dirty bit has the second value (e.g., 0), since the data of the corresponding page is not changed from a specific time point, a result of whether the corresponding page includes the code accessing the target memory area is the same as a result of the operation of determining whether the other preceding memory area exists, and therefore, the electronic device may skip the search of the corresponding page.

Since the electronic device according to the comparative example searches for a dirty page based on a dirty bit in the operating system with the user privilege, the electronic device may search for the page by allocating and/or processing metadata for the page. In contrast, another electronic device according to an embodiment does not need to perform an operation of transmitting and receiving a signal and/or processing a signal as it directly accesses the dirty bit with the kernel privilege, and therefore, the other electronic device may perform the search of the page faster than the electronic device according to the comparative example in terms of time and/or data throughput.

Figure 4:
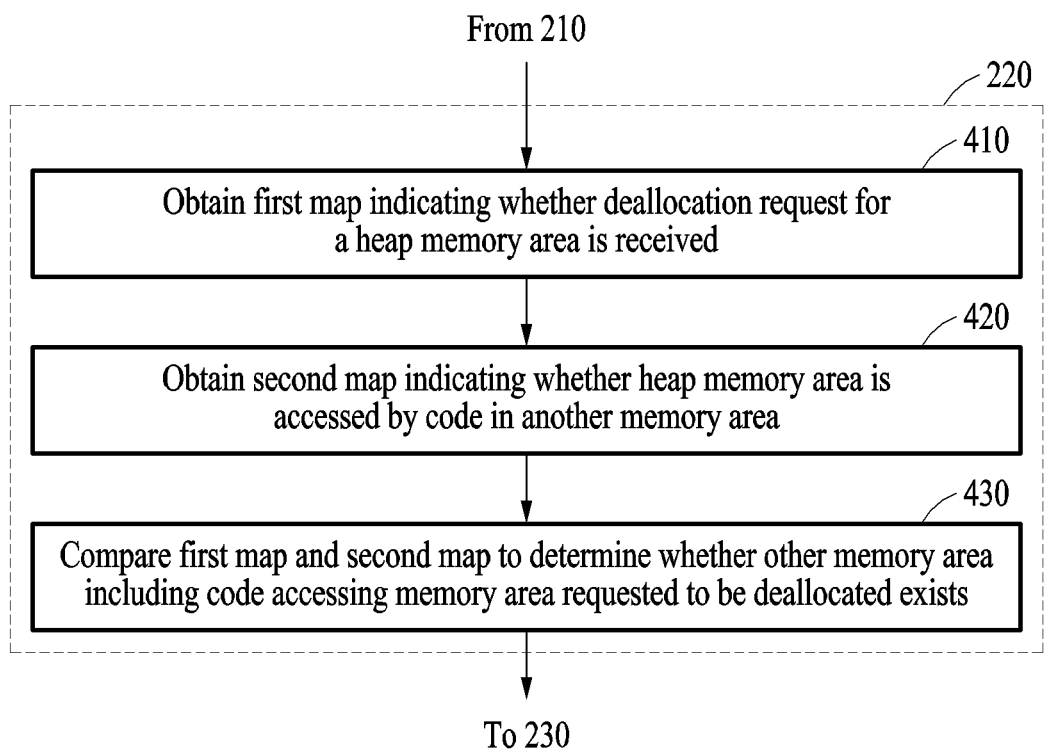
FIG. 4 is a flowchart illustrating an operation of determining whether another memory area exists using a first map and a second map by an electronic device according to various embodiments.

FIG. 4 is a flowchart illustrating an operation of determining whether another memory area exists using a first map and a second map by an electronic device according to various embodiments.

An electronic device (e.g., the electronic device 100 of FIG. 1) according to an embodiment may determine whether another memory area exists using a first map (e.g., a free map) and a second map (e.g., a mark map) with kernel privilege.

In operation 410, the electronic device may obtain a first map indicating whether a deallocation request for a heap memory area is received. The first map may include a plurality of elements, and each element of the first map may correspond to a part (e.g., a partial memory area) of the heap memory area. Each element of the first map may indicate whether the partial memory area corresponding to the corresponding element is requested to be deallocated. For example, when the element of the first map has the first value (e.g., 1), the element may indicate whether the partial memory area corresponding to the corresponding element is requested to be deallocated. When the element of the first map has the second value (e.g., 0), the element may indicate that the partial memory area corresponding to the corresponding element is not requested to be deallocated.

In operation 420, the electronic device may obtain the second map indicating whether the heap memory area is accessed by a code in another memory area. The second map may include a plurality of elements, and each element of the second map may correspond to the partial memory area. Each element of the second map may indicate whether the other memory area including the code accessing the partial memory area corresponding to the corresponding element exists. For example, when the element of the second map has the first value (e.g., 1), the element may indicate that the other memory area accessing the partial memory area corresponding to the corresponding element exists. When the element of the second map has the second value (e.g., 0), the element may indicate that the other memory area accessing the partial memory area corresponding to the corresponding element does not exist. The electronic device may update the second map by synchronously and/or asynchronously searching for the memory area (or the memory area and the register area).

For example, the electronic device may concurrently search for a dirty page (e.g., a page corresponding to a dirty bit when the dirty bit has the first value (e.g., 1)) with the kernel privilege, and when a virtual address indicated by a pointer is equal to or more than a lowest virtual address and equal to or less than a highest virtual address allocated by the operating system, the electronic device may linearly scan the memory to update the second map based on the detected pointers.

In operation 430, the electronic device may compare the first map and the second map to determine whether the other memory area including the code accessing the memory area requested to be deallocated exists.

For example, regarding the target memory area, when a corresponding element of the first map has the first value (e.g., 1) and a corresponding element of the second map has the first value (e.g., 1), the electronic device may determine that the target memory area is requested to be deallocated, but the other memory area including the code accessing the target memory area exists. After that, the electronic device may restrict the deallocation of the target memory area.

In another example, regarding the target memory area, when the corresponding element of the first map has the first value (e.g., 1) and the corresponding element of the second map has the second value (e.g., 0), the electronic device may determine that the target memory area is requested to be deallocated and the other memory area including the code accessing the target memory area does not exist. After that, the electronic device may deallocate the target memory area.

In another example, regarding the partial memory area, when the corresponding element of the first map has the first value (e.g., 0), the electronic device may determine that the partial memory area is not requested to be deallocated, independently of a corresponding element value of the second map.

Figure 5:
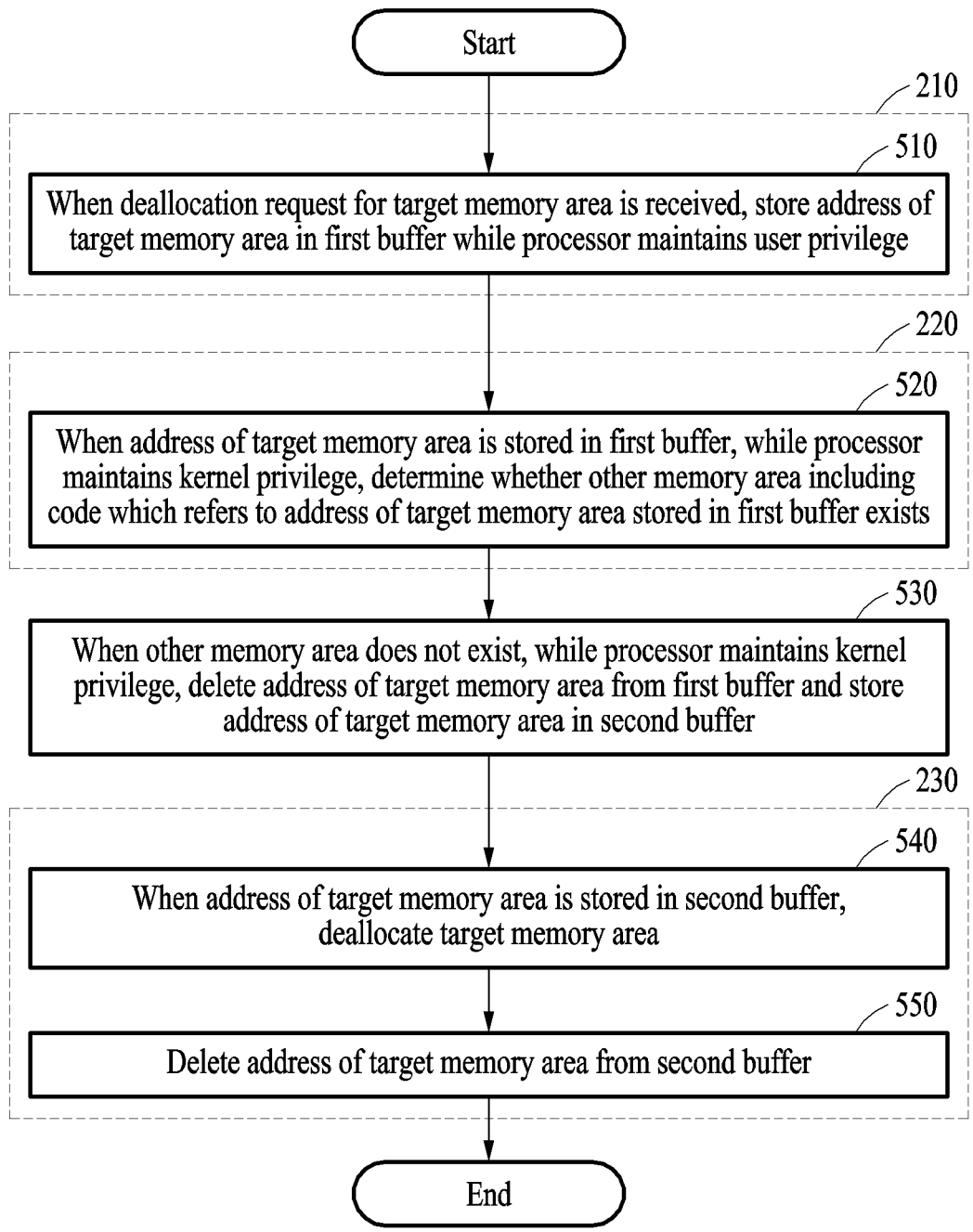
FIG. 5 is a flowchart illustrating a method of deallocating a dynamically allocated memory area by using a first buffer and a second buffer by an electronic device according to various embodiments.

FIG. 5 is a flowchart illustrating a method of deallocating a dynamically allocated memory area by using a first buffer and a second buffer by an electronic device according to various embodiments.

An electronic device (e.g., the electronic device 100 of FIG. 1) according to an embodiment may deallocate the dynamically allocated memory area using a first buffer (Unsafe Buffer of FIG. 1) and a second buffer (Safe Buffer of FIG. 1).

In operation 510, when a deallocation request for the target memory area is received, the electronic device may store an address of the target memory area in the first buffer while the processor maintains the user privilege.

According to an embodiment, the electronic device may store a virtual address of the target memory area in the first buffer. Hereinafter, the address of the target memory area to be stored and/or deleted in or from one of the first buffer or the second buffer may include a virtual address. However, the present disclosure is not limited to storing and/or deleting the virtual address of the memory area in or from one of the first buffer or the second buffer, and a physical address of the memory area may be stored and/or deleted in or from one of the first buffer or the second buffer.

The first buffer may store the address of the target memory area requested to be deallocated. According to an embodiment, the first buffer may be a sharing buffer accessible in both while the processor maintains the user privilege and while the processor maintains the kernel privilege. The electronic device may store the address of the target memory area in the first buffer with user privilege. The electronic device may delete the address of the target memory area from the first buffer with kernel privilege.

According to an embodiment, when the address of the target memory area is stored in the first buffer, the electronic device may update the element of the first map. For example, the electronic device may change a value of an element corresponding to the target memory area from among the plurality of elements of the first map from the second value (e.g., 0) to the first value (e.g., 1).

In operation 520, when the address of the target memory area is stored in the first buffer, while the processor maintains the kernel privilege, the electronic device may determine whether the other memory area including the code which refers to the address of the target memory area stored in the first buffer exists. The code which refers to the address of the target memory area may mean a code accessing the target memory area.

According to an embodiment, the electronic device may determine whether the other memory area including the code which refers to the heap memory area exists. The heap memory area may include a memory area stored in the first buffer. The electronic device may determine whether the other memory area including the code which refers to the corresponding memory area exists, not only for the memory area requested to be deallocated among the heap memory area (e.g., the target memory area), but also for the remaining memory area not requested to be deallocated. The electronic device may determine whether the other memory area including the code which refers to at least a part of the heap memory area exists for the heap memory area, thereby determining whether the other memory area exists independently of the chronological order of a time point at which the deallocation request is received and a time point at which whether the other memory area exists is determined.

For example, the electronic device may receive the deallocation request while performing an operation for determining whether the other memory area exists. Specifically, the electronic device may start the operation of determining whether the other memory area exists, receive the deallocation request for the target memory area, and then, complete the operation of determining whether the other memory area exists. By determining whether the other memory area exists for the heap memory area, the electronic device may, even for a memory area not requested to be deallocated at the time of starting the operation of determining whether the other memory area exists, search for the other memory area including the code which refers to the corresponding memory area. Although the electronic device receives the deallocation request for the corresponding memory area, while continuously performing the operation of determining whether the other memory area exists, the electronic device may not search for the memory area again, because the search for the other memory area for the corresponding memory area is performed already.

According to an embodiment, when the other memory area exists, the electronic device may maintain the storage of the address of the target memory area in the first buffer. When the storage of the address of the target memory area in the first buffer is maintained, the electronic device may restrict the deallocation of the target memory area.

In operation 530, when the other memory area does not exist, while the processor maintains the kernel privilege, the electronic device may delete the address of the target memory area from the first buffer and store the address of the target memory area in the second buffer.

The second buffer may store the address of the target memory area which is requested to be deallocated and determined to be deallocated. According to an embodiment, the second buffer may be a sharing buffer accessible both while the processor maintains user privilege and while the processor maintains kernel privilege. The electronic device may store the address of the target memory area in the second buffer with kernel privilege. For example, while the processor maintains the kernel privilege, the electronic device may move the address of the target memory area from the first buffer to the second buffer. The electronic device may delete the address of the target memory area from the second buffer with user privilege.

In operation 540, when the address of the target memory area is stored in the second buffer, the electronic device may deallocate the target memory area. According to an embodiment, the electronic device may deallocate the target memory area by transmitting the address of the target memory area to a heap allocator (e.g., the internal allocator (Internal Malloc) of FIG. 1).

In operation 550, the electronic device may delete the address of the target memory area from the second buffer.

Figure 6:
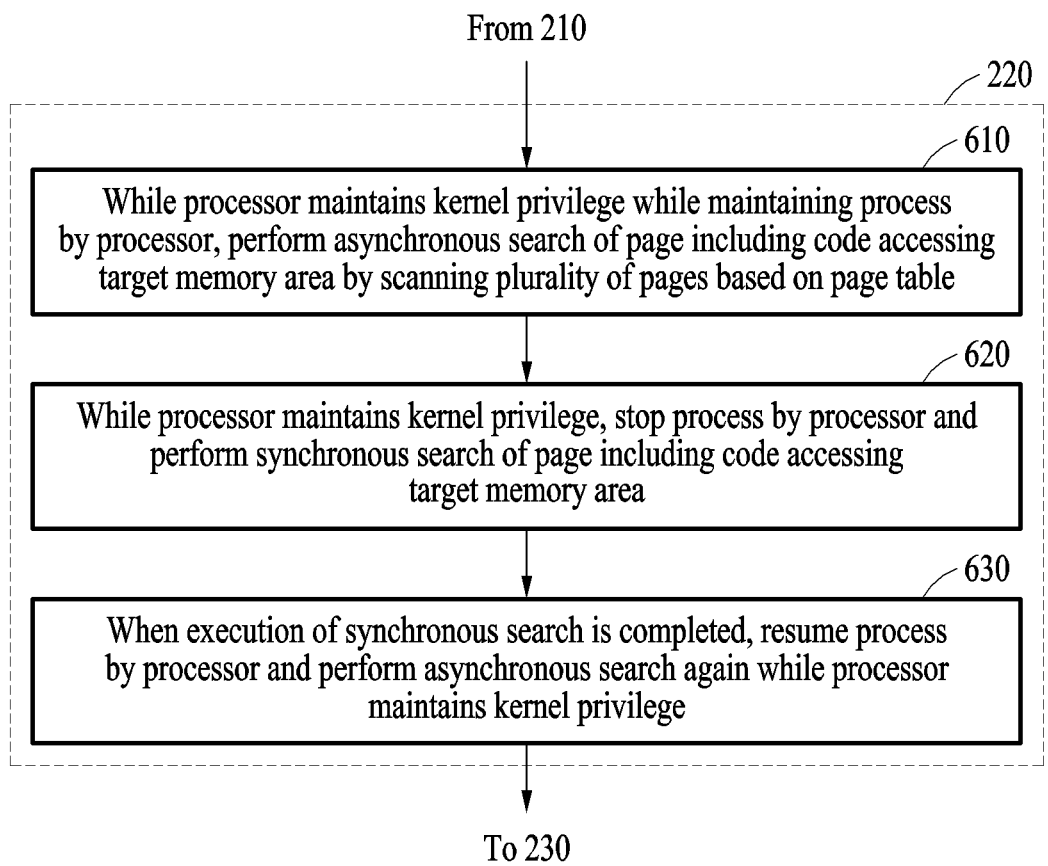
FIG. 6 is a flowchart illustrating an operation of determining whether another memory area exists using an asynchronous search and a synchronous search by an electronic device according to various embodiments.

FIG. 6 is a flowchart illustrating an operation of determining whether another memory area exists using an asynchronous search and a synchronous search by an electronic device according to various embodiments.

An electronic device (e.g., the electronic device 100 of FIG. 1) according to an embodiment may determine whether the other memory area exists using an asynchronous search and a synchronous search with kernel privilege. The asynchronous search may refer to a search of a page performed while maintaining a process by a processor, for example, without stopping the process by the processor. The synchronous search may refer to a search of a page performed by stopping a process by a processor, for example, while the process by the processor is stopped.

In operation 610, while the processor maintains the kernel privilege while maintaining the process by the processor, the electronic device may perform the asynchronous search of a page including a code accessing the target memory area by scanning a plurality of pages based on a page table.

In operation 620, while the processor maintains the kernel privilege, the electronic device may stop the process by the processor and perform the synchronous search of the page including the code accessing the target memory area.

According to an embodiment, when a size ratio of a memory area requested to be deallocated to a heap memory area exceeds a threshold ratio, the electronic device may perform the synchronous search. For example, when the threshold ratio is 0.5, the size of the heap is 128 MB, and the size of the memory area requested to be deallocated (e.g., a memory area corresponding to an address stored in the first buffer) exceeds 64 MB, the electronic device may perform the synchronous search.

For example, the electronic device may perform the synchronous search using task_work of Linux, which executes a callback function with kernel privilege. Since the electronic device according to an embodiment directly accesses the page table with kernel privilege, the additional metadata is not required and there is no need to read a separate file, and therefore, the process may not be affected. The electronic device may, immediately before executing the callback function for performing the synchronous search, read a page which is changed while performing the asynchronous search (e.g., a dirty page) to reduce the time during which the process is stopped due to the synchronous search.

According to an embodiment, the electronic device may perform the synchronous search for a register area along with the memory area.

For reference, when the code accessing the target memory area is stored only in the register area, if the electronic device performs only the synchronous search without performing the asynchronous search, the electronic device may erroneously determine that the other memory area does not exist, despite the existence of the other memory area (e.g., the register area). The electronic device according to an embodiment may perform the asynchronous search together with the synchronous search to reduce the time during which the process by the processor is stopped, through the synchronous search, and search for the other memory area including the register area through the asynchronous search.

In operation 630, when the execution of the synchronous search is completed, the electronic device may resume the process by the processor and perform the asynchronous search again while the processor maintains the kernel privilege.

Figure 7:
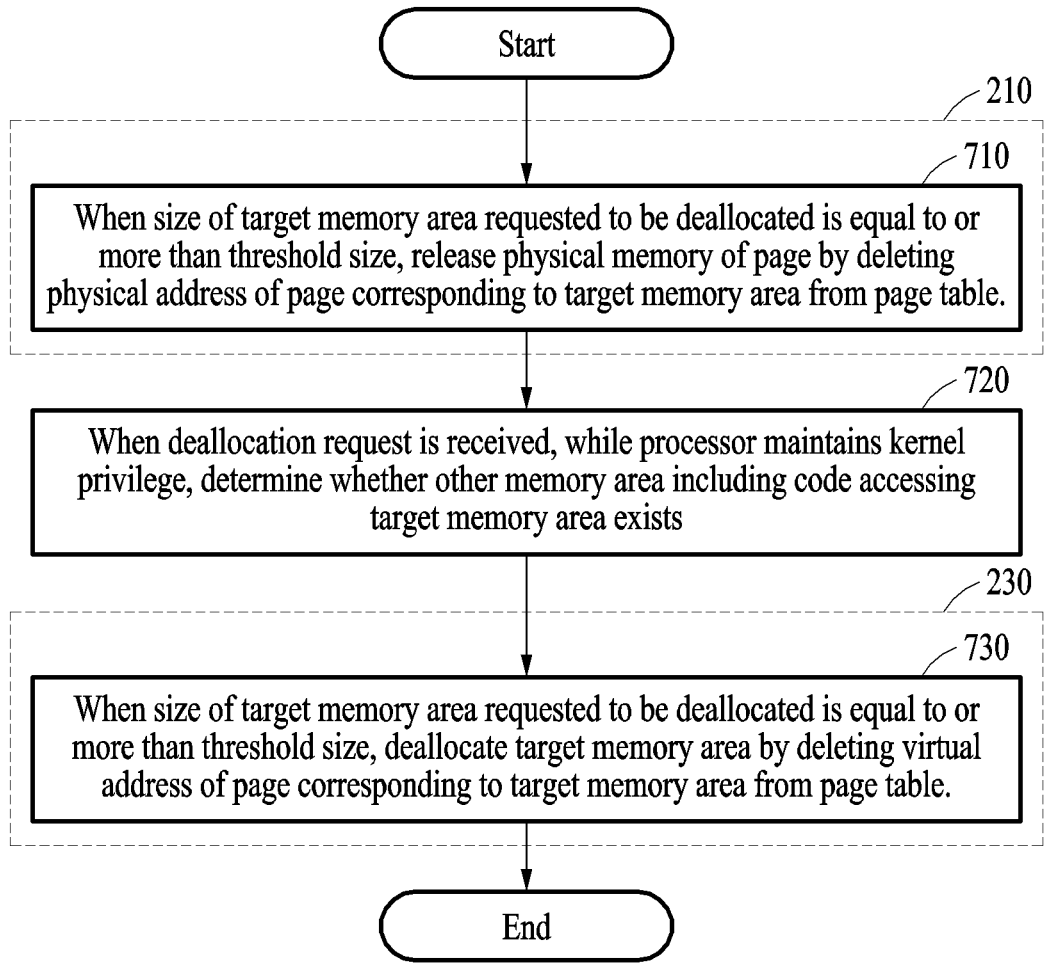
FIG. 7 is a flowchart illustrating a method of deallocating a target memory area exceeding a threshold size according to various embodiments.

FIG. 7 is a flowchart illustrating a method of deallocating a target memory area exceeding a threshold size according to various embodiments.

When a size of a target memory area requested to be deallocated exceeds a threshold size, an electronic device (e.g., the electronic device 100 of FIG. 1) according to an embodiment may release a physical memory first. The threshold size may be determined based on a size of a page. For example, the threshold size may be determined to be the same as the size of the page. When the size of the target memory area exceeds the threshold size, a page table may be changed because the target memory area may be allocated in units of pages.

In operation 710, when the size of the target memory area requested to be deallocated is equal to or more than the threshold size, the electronic device may release the physical memory of the page by deleting the physical address of the page corresponding to the target memory area from the page table. When a deallocation request for the target memory area is received, the electronic device may release the physical memory of the page first. As will be described later, when the other memory area which refers to the target memory area does not exist, the electronic device may complete the deallocation of the target memory area by releasing page mapping for the target memory area.

In operation 720, when the deallocation request is received, while the processor maintains the kernel privilege, the electronic device may determine whether the other memory area including the code accessing the target memory area exists.

In operation 730, when the size of the target memory area requested to be deallocated is equal to or more than the threshold size, the electronic device may deallocate the target memory area by deleting a virtual address of a page corresponding to the target memory area from the page table. For example, when the other memory area does not exist and the size of the target memory area is equal to or more than the threshold size, the electronic device may delete the virtual address of the target memory area from the page table.

Figure 8:
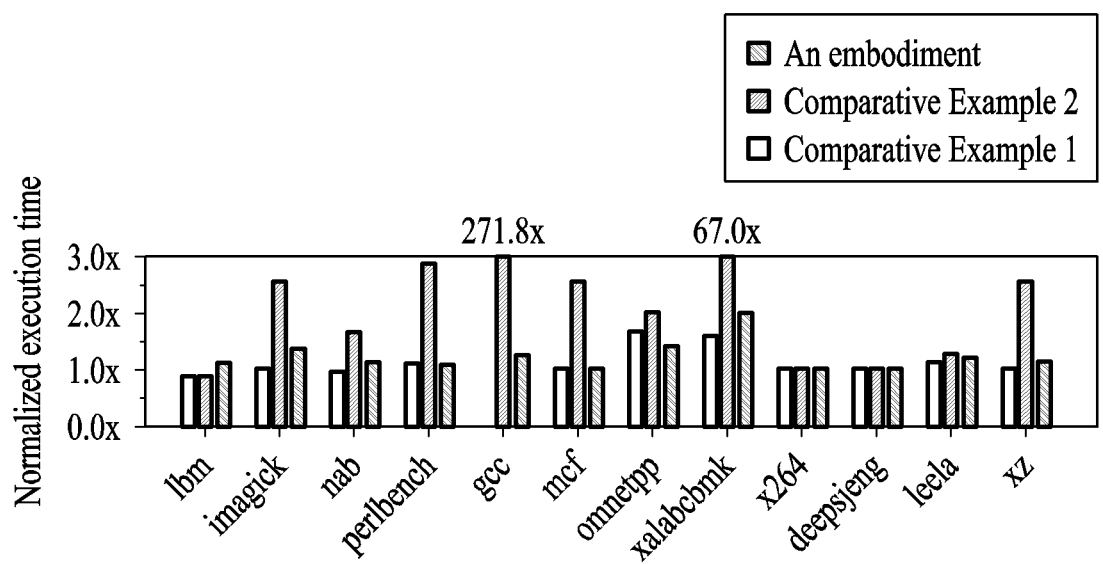
FIG. 8 is a graph showing an execution time of an electronic device according to an embodiment and comparative examples in a benchmark.

According to an embodiment, the electronic device may release the physical memory of the target memory area with kernel privilege through a MAP_FIXED flag of the mmap system call. After releasing the physical memory, the electronic device may limit additional system calls (e.g., madvice system call). For example, when the MAP_FIXED flag is not explicitly designated, the electronic device using the Linux operating system may initialize an anonymous page. Accordingly, even when accessing a target memory area which is not deallocated (e.g., a page, of which the deallocation is delayed), a process of calling the madvice system call may not be necessary because a memory area initialized to 0 is accessed. FIG. 8 is a graph showing an execution time of an electronic device according to an embodiment and comparative examples in a benchmark.

The electronic device according to an embodiment and comparative examples may be implemented to have AMD Ryzen 5 2600, 32 GB main memory, and Ubuntu 18.04. A kernel version may be v5.5.7. In order to measure performance overhead of the electronic device according to an embodiment, 12 benchmarks constituting SPEC CPU 2017 may be used. A reference input and recommended environment settings of existing SPEC CPU products may be used, in particular, OpenMP may be activated and the parameter OMP_THREAD_NUM may be set to 6. In addition, the GNU time utility may be used for the execution time and memory usage.

Comparative Example 1 may include an electronic device disclosed in the thesis "S. Ainsworth and T. M. Jones. MarkUs: Drop-in use-after-free prevention for low-level languages. In Proceedings of the 41st IEEE Symposium on Security and Privacy (Oakland), San Francisco, CA, May 2020". Comparative Example 2 may include an electronic device corrected not to be vulnerable for use-after-unmap in from an electronic device disclosed in the thesis "S. Ainsworth and T. M. Jones. MarkUs: Drop-in use-after-free prevention for low-level languages. In Proceedings of the 41st IEEE Symposium on Security and Privacy (Oakland), San Francisco, CA, May 2020". The electronic device according to Comparative Example 1 may operate at a marking frequency of 4. The electronic device according to Comparative Example 2 may operate at a marking frequency of 16.

The electronic device according to an embodiment may have execution time delay of 18.50% which is much smaller than execution time delay of 233.4% of the electronic device according to Comparative Example 2, in terms of a geometric mean. When executing a malloc-intensive benchmark such as perlbench benchmark, omnetpp benchmark, or xalancbmk benchmark, the electronic device according to an embodiment may show performance overhead similar to that in Comparative Example 1. Particularly, in the omnetpp benchmark and the perlbench benchmark, the electronic device according to an embodiment may have more excellent performance than the electronic device according to Comparative Example 1.

The performance advantage of the electronic device according to Comparative Example 1 comes from the instability of an optimization problem for a target memory area of having the threshold size or more, and when the optimization for the target memory area having the threshold size or more is released (e.g., the electronic device according to Comparative Example 2), the electronic device according to an embodiment may become slow in most benchmarks.

Figure 9:
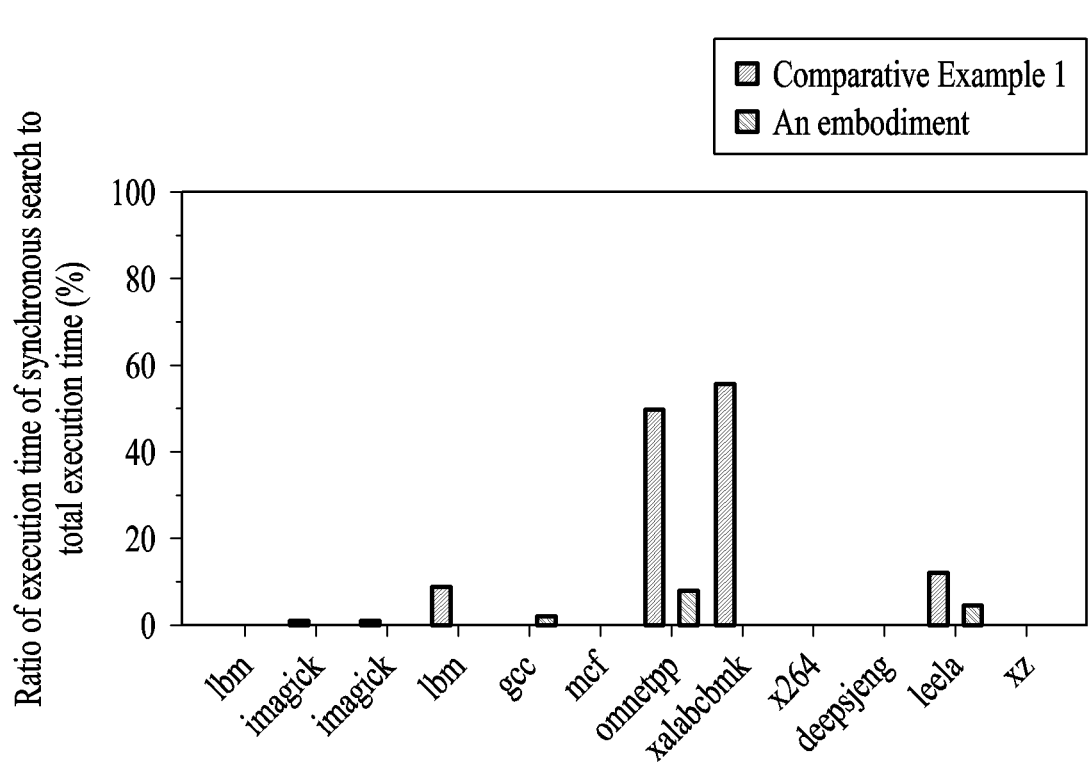
FIG. 9 is a graph showing an execution time of a synchronous search of an electronic device according to a comparative example and an embodiment in a benchmark.

FIG. 9 is a graph showing an execution time of a synchronous search of an electronic device according to a comparative example and an embodiment in a benchmark.

The electronic device according to an embodiment and a comparative example may be implemented to have AMD Ryzen 5 2600, 32 GB main memory, and Ubuntu 18.04. The kernel version may be v5.5.7. In order to measure performance overhead of an electronic device according to an embodiment, 12 benchmarks constituting SPEC CPU 2017 may be used. A reference input and recommended environment settings of existing SPEC CPU products may be used, in particular, OpenMP may be activated and the parameter OMP_THREAD_NUM may be set to 6. In addition, the GNU time utility may be used for the execution time and memory usage.

A comparative example may include an electronic device disclosed in the thesis "S. Ainsworth and T. M. Jones. MarkUs: Drop-in use-after-free prevention for low-level languages. In Proceedings of the 41st IEEE Symposium on Security and Privacy (Oakland), San Francisco, CA, May 2020". The electronic device according to the comparative example may operate at a marking frequency of 4.

In FIG. 9, the electronic device may implement the synchronous search with task_work of Linux by directly accessing the dirty bit of the page table with kernel privilege and searching for a dirty page, and therefore it may show that the stopping of the process by the processor does not have a significant effect. Particularly, the execution time of the synchronous search may be less than 5 seconds in most benchmarks. On the other hand, the execution time of the synchronous search of the electronic device according to the comparative example may cause considerable delay.

The operating system support technique of the invention disclosed in this disclosure may have the following three characteristics.

First, the processor may directly read the page table with kernel privilege, thereby more efficiently performing a marking procedure at the kernel level. In the comparative example in which the processor performs the marking procedure with user privilege, the dirty bit of the page table may not be read, because the marking procedure is performed at the user level. Instead, the electronic device according to the comparative example makes all pages as read-only pages through the mprotect system call and catches page faults to track all pages written by an application program. Accordingly, the waiting time of the parking procedure may increase, which may slow down the application process. In contrast, the electronic device according to an embodiment may minimize a performance effect of the marking procedure by avoiding this by using a method of directly reading the page table while the processor maintains the kernel privilege.

Secondly, the electronic device according to an embodiment may more simply implement releasing delay for a large chunk which causes a significant performance degradation.

After allocating separate mapping for the large chunk, the electronic device according to the comparative example may release the mapping without delay in response to a release request. However, when the mapping is released, in a case where the operating system kernel reuses a virtual page, the electronic device according to the comparative example may protect an unmapped page from malicious access until the resource is safely released by calling a system call. In contrast, the electronic device according to an embodiment may return only the physical memory without additional access control, and may return the virtual page to the operating system after confirming that it is ensured that the virtual page of the large chunk has no dangling pointer.

Thirdly, the electronic device according to an embodiment may implement synchronous memory scanning using task_work of the kernel, thereby significantly reducing the time for the synchronous search, unlike in the electronic device according to the comparative example. Since the electronic device according to the comparative example performs the synchronous search using a signal while the processor maintains user privilege, a performance degradation occurs compared to the support at the kernel level, which may significantly affect the execution time.

The electronic device according to an embodiment may be implemented with a wrapper of the GNU C Library (glibc) and an extended Linux kernel 5.5.7, among various implementations, in order to evaluate efficiency and effectiveness.

The embodiments described herein may be implemented using a hardware component, a software component and/or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may act as one or more software modules in order to perform the operations of the above-described embodiments, or vice versa.

As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of deallocating a dynamically allocated memory area performed by a processor, the method comprising:
   while the processor maintains user privilege, receiving a deallocation request for a dynamically allocated target memory area;
   while the processor maintains kernel privilege, determining whether an other memory area comprising a code accessing the target memory area exists; and
   while the processor maintains the user privilege, when the other memory area does not exist, deallocating the target memory area,
   wherein the determining of whether the other memory area exists comprises:
   when a dirty bit of a page table entry accessed with the kernel privilege has a first value, searching for a page corresponding to the page table entry; and
   when the dirty bit of the page table entry accessed with the kernel privilege has a second value, skipping a search of the page corresponding to the page table entry,
   wherein the searching of the page corresponding to the page table entry comprises:
   when the search of the page is completed, changing the dirty bit of the page table entry from the first value to the second value.

2. The method of claim 1, wherein the determining of whether the other memory area exists comprises:
   while the processor maintains the kernel privilege, determining whether the other memory area exists through a marking thread, from which execution with the user privilege is excluded.

3. The method of claim 1, further comprising:
   while a process is executed by the processor, when data stored in a page is changed, setting the dirty bit of the page table entry of the page to the first value.

4. The method of claim 1, wherein the determining of whether the other memory area exists comprises:
   obtaining a first map indicating whether a deallocation request for a heap memory area is received;
   obtaining a second map indicating whether the heap memory area is accessed by a code of the other memory area; and
   determining whether the other memory area comprising a code accessing a memory area requested to be deallocated exists by comparing the first map with the second map.

5. The method of claim 1,
   wherein the receiving of the deallocation request comprises, when the deallocation request for the target memory area is received, while the processor maintains the user privilege, storing an address of the target memory area in a first buffer, and
   wherein the determining of whether the other memory area exists comprises, when the address of the target memory area is stored in the first buffer, while the processor maintains the kernel privilege, determining whether the other memory area comprising a code which refers to the address of the target memory area stored in the first buffer exists.

6. The method of claim 5, further comprising:
   when the other memory area exists, maintaining the storage of the address of the target memory area in the first buffer.

7. The method of claim 5, further comprising:
   when the other memory area does not exist, while the processor maintains the kernel privilege, deleting the address of the target memory area from the first buffer and storing the address in a second buffer,
   wherein the deallocating of the target memory area comprises:
   when the address of the target memory area is stored in the second buffer, deallocating the target memory area; and
   deleting the address of the target memory area from the second buffer.

8. The method of claim 1, wherein the determining of whether the other memory area exists comprises:
   while the processor maintains the kernel privilege while maintaining a process by the processor, performing an asynchronous search of a page comprising the code accessing the target memory area by scanning a plurality of pages based on a page table; and
   while the processor maintains the kernel privilege, stopping the process by the processor, and performing a synchronous search of the page comprising the code accessing the target memory area.

9. The method of claim 8, wherein the determining of whether the other memory area exists comprises:
   when the execution of the synchronous search is completed, resuming the process by the processor, and while the processor maintains the kernel privilege, performing the asynchronous search again.

10. The method of claim 8, wherein the performing of the synchronous search of the page comprises:
    performing the synchronous search for a register area together with the memory area.

11. The method of claim 1, further comprising:
    when the other memory area comprising the code accessing the target memory area exists, restricting deallocation of the target memory area; and
    redetermining whether the other memory area exists.

12. The method of claim 1, wherein the receiving of the deallocation request comprises:
when a size of the target memory area requested to be deallocated is equal to or more than a threshold size, releasing a physical memory of the page by deleting the physical address of the page corresponding to the target memory area from a page table.

13. The method of claim 1, wherein the deallocating of the target memory area comprises:
when a size of the target memory area requested to be deallocated is equal to or more than a threshold size, deallocating the target memory area by deleting a virtual address of a page corresponding to the target memory area from a page table.

14. A non-transitory computer-readable storage medium storing instructions that, when executed by a processor, cause the processor to perform the method of claim 1.

15. An electronic device comprising:
a processor configured to:
while the processor maintains user privilege, receive a deallocation request for a dynamically allocated target memory area;
while the processor maintains kernel privilege, determine whether an other memory area comprising a code accessing the target memory area exists; and
when the other memory area does not exist, while the processor maintains the user privilege, deallocate the target memory area,
wherein the processor is configured to:
when a dirty bit of a page table entry accessed with the kernel privilege has a first value, search for a page corresponding to the page table entry;
when the dirty bit of the page table entry accessed with the kernel privilege has a second value, skip a search of the page corresponding to the page table entry; and
when the search of the page is completed, changing the dirty bit of the page table entry from the first value to the second value.

16. The electronic device of claim 15, wherein the processor is configured to:
while the processor maintains the kernel privilege, determine whether the other memory area exists through a marking thread, from which execution with the user privilege is excluded.

17. The electronic device of claim 15, wherein the processor is configured to:
while the processor maintains the kernel privilege while maintaining a process by the processor, perform an asynchronous search of a page comprising the code accessing the target memory area by scanning a plurality of pages based on a page table; and
while the processor maintains the kernel privilege, stop the process by the processor, and perform a synchronous search of a page comprising the code accessing the target memory area.

* * * * *